United States Patent
Foley et al.

(10) Patent No.: US 10,235,104 B1
(45) Date of Patent: Mar. 19, 2019

(54) IO REQUEST SYSTEM AND METHOD

(71) Applicant: EMC CORPORATION, Hopkinton, MA (US)

(72) Inventors: Robert P. Foley, Clinton, MA (US); Peter Puhov, Shrewsbury, MA (US); David W. Harvey, Newton, MA (US); Daniel E. Cummins, Hudson, NH (US); Marc C. Cassano, Medway, MA (US); Henry A. Spang, IV, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 116 days.

(21) Appl. No.: 14/871,803

(22) Filed: Sep. 30, 2015

(51) Int. Cl.
*G06F 3/06* (2006.01)
*G06F 13/10* (2006.01)

(52) U.S. Cl.
CPC .......... *G06F 3/0689* (2013.01); *G06F 3/0611* (2013.01); *G06F 3/0659* (2013.01); *G06F 13/102* (2013.01)

(58) Field of Classification Search
CPC .... G06F 3/0689; G06F 3/0611; G06F 3/0659; G06F 13/102
See application file for complete search history.

(56) References Cited

U.S. PATENT DOCUMENTS

| | | | | |
|---|---|---|---|---|
| 7,739,470 B1* | 6/2010 | Norgren | .............. | G06F 11/3409 709/224 |
| 8,843,630 B1* | 9/2014 | Thomas | .............. | H04L 67/1008 370/229 |
| 2004/0194095 A1* | 9/2004 | Lumb | .................. | G06F 9/4887 718/100 |
| 2004/0199515 A1* | 10/2004 | Penny | .................. | G06F 3/0607 |
| 2005/0015371 A1* | 1/2005 | Hetzler | .............. | G06F 11/1076 |
| 2013/0297907 A1* | 11/2013 | Ki | ........................ | G06F 12/0684 711/170 |
| 2015/0026514 A1* | 1/2015 | Benhase | ............. | G06F 11/2066 714/6.23 |
| 2016/0077745 A1* | 3/2016 | Patel | ..................... | G06F 3/0608 714/704 |
| 2016/0266934 A1* | 9/2016 | Rimoni | ................. | G06F 9/4881 |

* cited by examiner

*Primary Examiner* — Nanci N Wong
(74) *Attorney, Agent, or Firm* — Brian J. Colandreo; Mark H. Whittenberger; Holland & Knight LLP

(57) ABSTRACT

A method, computer program product, and computing system for receiving an IO request for a RAID array. An actual queue depth of the RAID array is compared to a maximum queue depth for the RAID array. An IO queue weight is determined for the IO request. The IO queue weight is revised based upon a degrade mode condition for the RAID array, thus defining a revised IO queue weight. The actual queue depth is incremented based upon the revised IO queue weight.

21 Claims, 3 Drawing Sheets

IO REQUEST SYSTEM AND METHOD

TECHNICAL FIELD

This disclosure relates to storage systems and, more particularly, to systems and methods for storing and retrieving data.

BACKGROUND

Storing and safeguarding electronic content is of paramount importance in modern business. Accordingly, various methodologies may be employed to protect such electronic content. One such methodology is to store electronic content to and retrieve electronic content from RAID arrays. As users access this electronic content on these RAID arrays, IO requests will be processed. Unfortunately, when a large quantity of IO requests are received by RAID arrays during a short period of time, such RAID arrays may become bogged down and performance may be adversely impacted.

SUMMARY OF DISCLOSURE

In one implementation, a computer-implemented method includes receiving an IO request for a RAID array. An actual queue depth of the RAID array is compared to a maximum queue depth for the RAID array. An IO queue weight is determined for the IO request. The IO queue weight is revised based upon a degrade mode condition for the RAID array, thus defining a revised IO queue weight. The actual queue depth is incremented based upon the revised IO queue weight.

One or more of the following features may be included. Comparing an actual queue depth of the RAID array to a maximum queue depth for the RAID array may include determining if the IO request is rejectable. Comparing an actual queue depth of the RAID array to a maximum queue depth for the RAID array may further include: if the IO request is rejectable, rejecting the IO request if the actual queue depth exceeds the maximum queue depth. Revising the IO queue weight based upon a degrade mode condition of the RAID array may include multiplying the IO queue weight by a degrade mode multiplier to generate the revised IO queue weight. The maximum queue depth for the RAID array may be defined based, at least in part, upon one or more of: the number of drives in the RAID array, and the type of drives in the RAID array. The actual queue depth may be decremented based upon the revised IO queue weight upon execution of the IO request. The RAID array may include one or more of: a hard disk drive and a solid state disk.

In another implementation, a computer program product resides on a computer readable medium and has a plurality of instructions stored on it. When executed by a processor, the instructions cause the processor to perform operations including receiving an IO request for a RAID array. An actual queue depth of the RAID array is compared to a maximum queue depth for the RAID array. An IO queue weight is determined for the IO request. The IO queue weight is revised based upon a degrade mode condition for the RAID array, thus defining a revised IO queue weight. The actual queue depth is incremented based upon the revised IO queue weight.

One or more of the following features may be included. Comparing an actual queue depth of the RAID array to a maximum queue depth for the RAID array may include determining if the IO request is rejectable. Comparing an actual queue depth of the RAID array to a maximum queue depth for the RAID array may further include: if the IO request is rejectable, rejecting the IO request if the actual queue depth exceeds the maximum queue depth. Revising the IO queue weight based upon a degrade mode condition of the RAID array may include multiplying the IO queue weight by a degrade mode multiplier to generate the revised IO queue weight. The maximum queue depth for the RAID array may be defined based, at least in part, upon one or more of: the number of drives in the RAID array, and the type of drives in the RAID array. The actual queue depth may be decremented based upon the revised IO queue weight upon execution of the IO request. The RAID array may include one or more of: a hard disk drive and a solid state disk.

In another implementation, a computing system including a processor and memory is configured to perform operations including receiving an IO request for a RAID array. An actual queue depth of the RAID array is compared to a maximum queue depth for the RAID array. An IO queue weight is determined for the IO request. The IO queue weight is revised based upon a degrade mode condition for the RAID array, thus defining a revised IO queue weight. The actual queue depth is incremented based upon the revised IO queue weight.

One or more of the following features may be included. Comparing an actual queue depth of the RAID array to a maximum queue depth for the RAID array may include determining if the IO request is rejectable. Comparing an actual queue depth of the RAID array to a maximum queue depth for the RAID array may further include: if the IO request is rejectable, rejecting the IO request if the actual queue depth exceeds the maximum queue depth. Revising the IO queue weight based upon a degrade mode condition of the RAID array may include multiplying the IO queue weight by a degrade mode multiplier to generate the revised IO queue weight. The maximum queue depth for the RAID array may be defined based, at least in part, upon one or more of: the number of drives in the RAID array, and the type of drives in the RAID array. The actual queue depth may be decremented based upon the revised IO queue weight upon execution of the IO request. The RAID array may include one or more of: a hard disk drive and a solid state disk.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
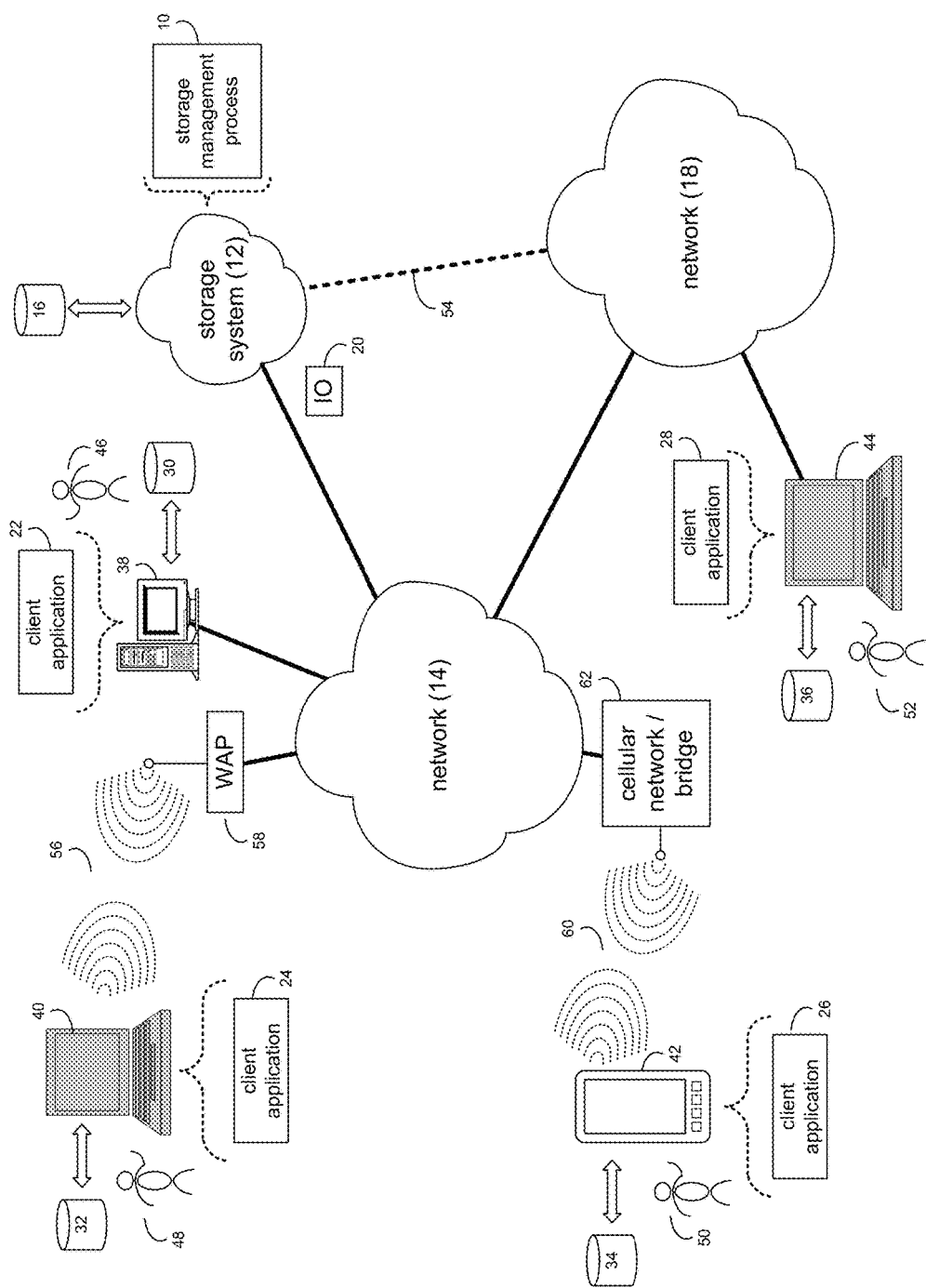
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
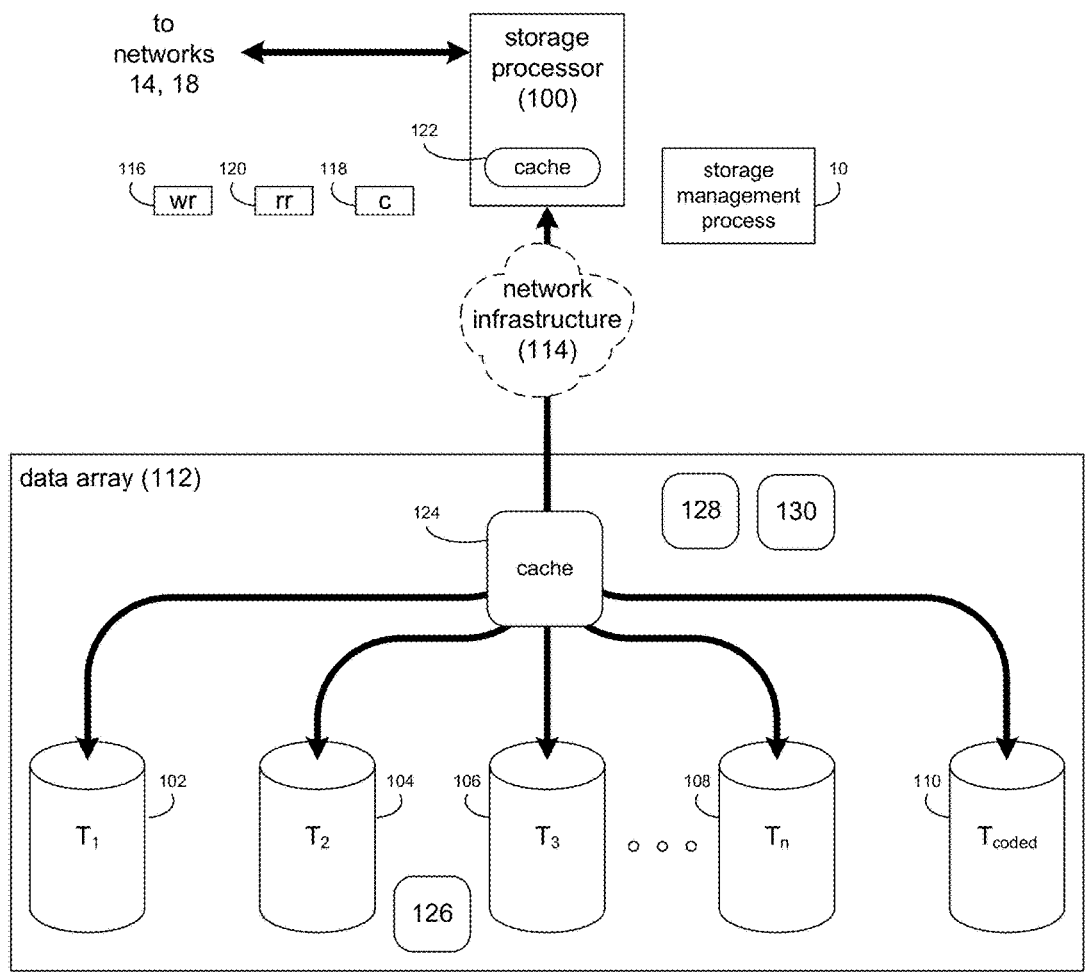
FIG. 2 is a diagrammatic view of the storage system of FIG. 1.

Referring also to FIG. 2, storage system 12 may include storage processor 100 and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

Additionally, assume that data array 112 defines and exposes Logical Units (e.g., LUN 126) that may allow for the storage of data within data array 200.

Figure 3:
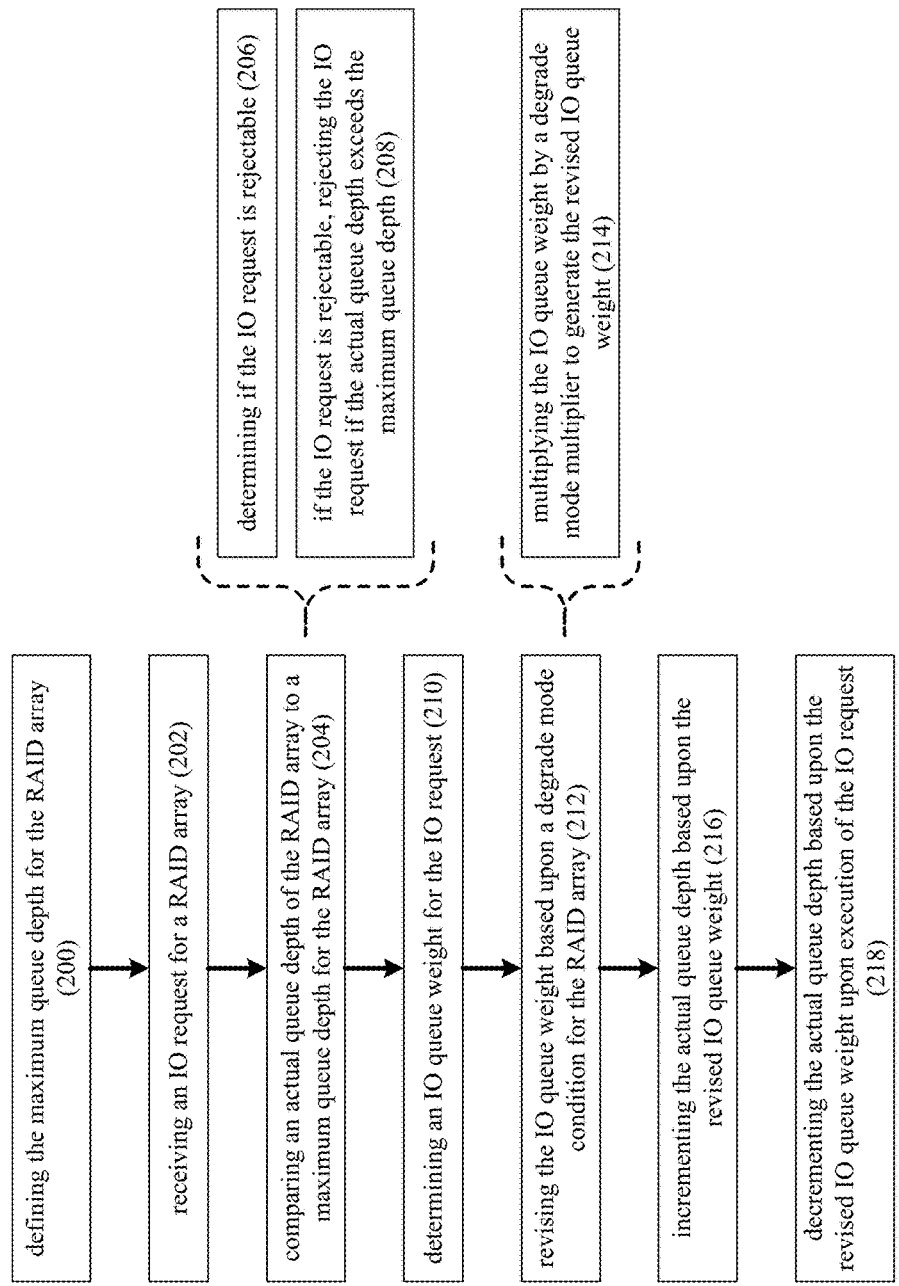
FIG. 3 is a flow chart of the storage management process of FIG. 1.

The Storage Management Process:

Referring also to FIG. 3 and as will be discussed below in greater detail, storage management process 10 may be configured to monitor the quantity of IO requests (e.g., data write request 116 and/or data read request 120) pending before RAID array 112; wherein storage management process 10 may be further configured to regulate this quantity of IO requests in order to avoid overloading RAID array 112.

Storage management process 10 may be configured to define 200 a maximum queue depth (e.g., maximum queue depth 128) for a RAID array (e.g., data array 112), wherein maximum queue depth 128 may be based, at least in part, upon one or more of: the number of drives included within the RAID array (e.g., data array 112), and the type of drives (e.g., hard disk drives or solid state drives) included within the RAID array (e.g., data array 112).

When defining 200 maximum queue depth 128, storage management process 10 may algorithmically define maximum queue depth 128. For example, storage management process 10 may define a discrete maximum queue depth of "30" pending IOs for each hard disk drive and a discrete maximum queue depth of "60" pending IOs for each solid state drive.

Assume for the following example that data array 112 is a standard RAID 5 configuration that include four data drives and one parity drive (for a total of five drives, all of which are hard disk drives). Accordingly, storage management process 10 may define 200 a maximum queue depth (e.g., maximum queue depth 128) of "150" for data array 112 (e.g., a discrete maximum queue depth of "30" pending IOs per drive times five drives).

As discussed above, data array 112 may define and expose Logical Units (e.g., LUN 126) that may allow for the storage of data within data array 200. Storage management process 10 may receive 202 an IO request (e.g., write request 116 and/or read request 120) for e.g., LUN 126 within the RAID array (e.g., data array 112).

Upon receiving 202 the IO request (e.g., write request 116 and/or read request 120), storage management process 10 may compare 204 an actual queue depth (e.g., actual queue depth 130) of the RAID array (e.g., data array 112) to the maximum queue depth (e.g., maximum queue depth 128) for the RAID array (e.g., data array 112).

Specifically, the actual queue depth (e.g., actual queue depth 130) of the RAID array (e.g., data array 112) may be indicative of the current number of IO requests pending before data array 112 (namely the quantity of IO requests that are currently waiting to be processed by data array 112). Accordingly and in one implementation, when there are no pending IO requests before data array 112, the value of actual queue depth 130 for data array 112 would be "0".

When comparing 204 the actual queue depth (e.g., actual queue depth 130) of the RAID array (e.g., data array 112) to the maximum queue depth (e.g., maximum queue depth 128) for the RAID array (e.g., data array 112), storage management process 10 may determine 206 if the IO request (e.g., write request 116 and/or read request 120) is rejectable. Specifically, certain IO requests may be deemed not rejectable. One example of such a "non-rejectable" IO request may include but is not limited to IO requests that are intended to bypass a cache memory system (e.g., backend cache memory system 124). Other examples may include but are not limited to a rebuild request or a background verify request.

In one implementation, when an IO request is deemed non-rejectable, a flag may be set that indicates the status of the IO request as non-rejectable. Accordingly and when storage management process 10 is determining 206 if the IO request is rejectable, storage management process 10 may look for the presence of such a flag.

Further and when comparing 204 the actual queue depth (e.g., actual queue depth 130) of the RAID array (e.g., data array 112) to the maximum queue depth (e.g., maximum queue depth 128) for the RAID array (e.g., data array 112), storage management process 10 may reject 208 the IO request (e.g., write request 116 and/or read request 120) if the actual queue depth (e.g., actual queue depth 130) exceeds the maximum queue depth (e.g., maximum queue depth 128); and the IO request (e.g., maximum queue depth 128) is rejectable.

Accordingly, if actual queue depth 130 is "152" and (as discussed above) and maximum queue depth 128 (as discussed above) is "150", the actual queue depth (e.g., actual queue depth 130) does indeed exceed the maximum queue depth (e.g., maximum queue depth 128). Accordingly and assuming that the IO request in question is rejectable, storage management process 10 may reject 208 the IO request (e.g., write request 116 and/or read request 120). Therefore, storage management process 10 may notify storage processor 100 and/or frontend cache memory system 122 that data array 112 is currently unable to accept the IO request in question, wherein storage processor 100 and/or frontend cache memory system 122 may subsequently resubmit the IO request in question.

Further, if the actual queue depth 130 is less than maximum queue depth 128 (or the IO request in question is not rejectable), storage management process 10 may accept the IO request in question and process the same.

Continuing with the above-stated example, storage management process 10 may determine 210 an IO queue weight for the IO request. Specifically, storage management process 10 may examine each IO request so that its impact on actual queue depth 130 may be determined. As discussed above, IO requests may be write requests (e.g., write request 116) or read requests (e.g., read request 120). As is known in the art, read requests (e.g., read request 120) do not require a write to a parity drive (e.g., coded target 110), while write requests (e.g., write request 116) do require a recalculation of parity and a write operation performed on the parity drive (e.g., coded target 110). When determining 210 an IO queue weight for the IO request, storage management process 10 may look at the size of the IO request. For example, a "small" read request (e.g., under 64 kilobytes of data) may access only one data drive and (being a read request) zero parity drives. Accordingly, such a "small" read request may have an IO queue weight of one IO request. "Larger" read requests may have larger IO queue weights. For example, a 128 kilobyte read request may have an IO queue weight of two IO requests; a 192 kilobyte read request may have an IO queue weight of three IO requests; and a 256 kilobyte read request may have an IO queue weight of four IO requests.

As discussed above, write requests (e.g., write request 116) require a recalculation of parity and a write operation to be performed on the parity drive (e.g., coded target 110). Accordingly, such a 64 kilobyte write request may have an IO queue weight of four IO requests (i.e., one pre-read of data, one pre-read of parity, one for the write to the data drive and one for the write to the parity drive). "Larger" write requests may have larger IO queue weights. For example, a 128 kilobyte write request may have an IO queue weight of six IO requests (i.e., two pre-reads of data, one pre-read of parity, two for the writes to the data drives and one for the write to the parity drive); and a 192 kilobyte write request may have an IO queue weight of eight IO requests (i.e., three pre-reads of data, one pre-read of parity, three for the writes to the data drives and one for the write to the parity drive). A 256 kilobyte write request (in this example) would write to the entire set of drives (i.e., would write an entire data stripe) and, therefore, does not require any pre-reads. Therefore, a 256 kilobyte write request may have an IO queue weight of five IO requests (i.e., four for the writes to the data drives and one for the write to the parity drive).

Once the IO queue weight is determined 210, storage management process 10 may revise 212 the IO queue weight based upon a degrade mode condition for the RAID array (e.g., data array 112), thus defining a revised IO queue weight. For example, storage management process 10 may determine whether data array 112 is currently operating in degraded mode (e.g., due to a failed drive) and that failed drive is currently being rebuilt onto a "hot spare". As is known in the art, a rebuild operation is a computational intensive operation. Accordingly, when revising 212 the IO queue weight based upon a degrade mode condition of the RAID array (e.g., data array 112), storage management process 10 may multiply 214 the IO queue weight (as determined 210 above) by a degrade mode multiplier to generate the revised IO queue weight (thus allowing actual queue depth 130 to be incremented faster and, therefore, IO requests to be rejected more quickly; thus freeing up bandwidth for performing the above-described rebuild operation.

An example of such a degrade mode multiple may be a 3× multiplier during degraded mode operation and a 1× multiplier during normal mode operation. Accordingly and for the 128 kilobyte write request having an IO queue weight of six IO requests, if such an operation is being performed during a degraded mode, this 128 kilobyte write request may have a revised IO queue weight of eighteen IO requests (i.e., six IO requests times a 3× multiplier). Conversely and for the same 128 kilobyte write request having an IO queue weight of six IO requests, if such an operation is being performed during a "normal" mode (i.e., not a degraded mode), this 128 kilobyte write request may have a revised IO queue weight of six IO requests (i.e., six IO requests times a 1× multiplier).

Storage management process 10 may then increment 216 the actual queue depth (e.g., actual queue depth 130) based upon the revised IO queue weight. Accordingly, if actual queue depth 130 is "140" and maximum queue depth 128 (as discussed above) is "150", the actual queue depth (e.g., actual queue depth 130) may be incremented to "146" (e.g., if the 128 kilobyte write request is being performed during a "normal" mode) and "158" (e.g., if the 128 kilobyte write request is being performed during a "degraded" mode).

And continuing with the above-stated example, once the 128 kilobyte write request has been executed, storage management process 10 may decrement 218 the actual queue depth (e.g., actual queue depth 130) based upon the revised IO queue weight. Accordingly, actual queue depth 130 may be decremented 218 by a value of "6" or "18" once the 128 kilobyte write request has been executed (depending upon whether actual queue depth 130 was initially incremented 216 by a value of "6" or "18".

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving an IO request for a RAID array;
   comparing an actual queue depth of the RAID array to a maximum queue depth for the RAID array;
   determining an IO queue weight for the IO request based upon, at least in part, a type of operation performed on the RAID array as specified by the IO request and a size of the IO request, wherein the size of the IO request includes a data size, wherein determining the IO queue weight comprises:
      defining a read request of a first data size to have an IO queue weight of one IO request,
      defining a write request of a first data size to have an IO queue weight of at least four IO requests, and
      defining one or more of a read request of a second data size and a write request of a second data size to have an IO queue weight of multiple IO requests, wherein the size of one or more of the read request of the second data size and the write request of the second data size is a multiple of the size of one or more of the read request of the first data size and the write request of the first data size;
   revising the IO queue weight based upon a degrade mode condition for the RAID array, thus defining a revised IO queue weight, wherein the degrade mode condition is due to a failed drive of the RAID array; and
   incrementing the actual queue depth based upon the revised IO queue weight.

2. The computer-implemented method of claim 1 wherein comparing an actual queue depth of the RAID array to a maximum queue depth for the RAID array includes:
   determining if the IO request is rejectable.

3. The computer-implemented method of claim 2 wherein comparing an actual queue depth of the RAID array to a maximum queue depth for the RAID array further includes:
   if the IO request is rejectable, rejecting the IO request if the actual queue depth exceeds the maximum queue depth.

4. The computer-implemented method of claim 1 wherein revising the IO queue weight based upon a degrade mode condition of the RAID array includes:
   multiplying the IO queue weight by a degrade mode multiplier to generate the revised IO queue weight.

5. The computer-implemented method of claim 1 further comprising:
   defining the maximum queue depth for the RAID array based, at least in part, upon one or more of: the number of drives in the RAID array, and the type of drives in the RAID array.

6. The computer-implemented method of claim 1 further comprising:
   decrementing the actual queue depth based upon the revised IO queue weight upon execution of the IO request.

7. The computer-implemented method of claim 1 wherein the RAID array includes one or more of: a hard disk drive and a solid state disk.

8. A computer program product residing on a non-transitory computer readable medium having a plurality of instructions stored thereon which, when executed by a processor, cause the processor to perform operations comprising:
   receiving an IO request for a RAID array;
   comparing an actual queue depth of the RAID array to a maximum queue depth for the RAID array;
   determining an IO queue weight for the IO request based upon, at least in part, a type of operation performed on the RAID array as specified by the IO request and a size of the IO request, wherein the size of the IO request includes a data size, wherein determining the IO queue weight comprises:
      defining a read request of a first data size to have an IO queue weight of one IO request,
      defining a write request of a first data size to have an IO queue weight of at least four IO requests, and
      defining one or more of a read request of a second data size and a write request of a second data size to have an IO queue weight of multiple IO requests, wherein the size of one or more of the read request of the second data size and the write request of the second data size is a multiple of the size of one or more of the read request of the first data size and the write request of the first data size;
   revising the IO queue weight based upon a degrade mode condition for the RAID array, thus defining a revised IO queue weight, wherein the degrade mode condition is due to a failed drive of the RAID array; and
   incrementing the actual queue depth based upon the revised IO queue weight.

9. The computer program product of claim 8 wherein comparing an actual queue depth of the RAID array to a maximum queue depth for the RAID array includes:
   determining if the IO request is rejectable.

10. The computer program product of claim 9 wherein comparing an actual queue depth of the RAID array to a maximum queue depth for the RAID array further includes:
if the IO request is rejectable, rejecting the IO request if the actual queue depth exceeds the maximum queue depth.

11. The computer program product of claim 8 wherein revising the IO queue weight based upon a degrade mode condition of the RAID array includes:
multiplying the IO queue weight by a degrade mode multiplier to generate the revised IO queue weight.

12. The computer program product of claim 8 further comprising instructions for:
defining the maximum queue depth for the RAID array based, at least in part, upon one or more of: the number of drives in the RAID array, and the type of drives in the RAID array.

13. The computer program product of claim 8 further comprising instructions for:
decrementing the actual queue depth based upon the revised IO queue weight upon execution of the IO request.

14. The computer program product of claim 8 wherein the RAID array includes one or more of: a hard disk drive and a solid state disk.

15. A computing system including a processor and memory configured to perform operations comprising:
receiving an IO request for a RAID array;
comparing an actual queue depth of the RAID array to a maximum queue depth for the RAID array;
determining an IO queue weight for the IO request based upon, at least in part, a type of operation performed on the RAID array as specified by the IO request and a size of the IO request, wherein the size of the IO request includes a data size, wherein determining the IO queue weight comprises:
defining a read request of a first data size to have an IO queue weight of one IO request,
defining a write request of a first data size to have an IO queue weight of at least four IO requests, and
defining one or more of a read request of a second data size and a write request of a second data size to have an IO queue weight of multiple IO requests, wherein the size of one or more of the read request of the second data size and the write request of the second data size is a multiple of the size of one or more of the read request of the first data size and the write request of the first data size;
revising the IO queue weight based upon a degrade mode condition for the RAID array, thus defining a revised IO queue weight, wherein the degrade mode condition is due to a failed drive of the RAID array; and
incrementing the actual queue depth based upon the revised IO queue weight.

16. The computing system of claim 15 wherein comparing an actual queue depth of the RAID array to a maximum queue depth for the RAID array includes:
determining if the IO request is rejectable.

17. The computing system of claim 16 wherein comparing an actual queue depth of the RAID array to a maximum queue depth for the RAID array further includes:
if the IO request is rejectable, rejecting the IO request if the actual queue depth exceeds the maximum queue depth.

18. The computing system of claim 15 wherein revising the IO queue weight based upon a degrade mode condition of the RAID array includes:
multiplying the IO queue weight by a degrade mode multiplier to generate the revised IO queue weight.

19. The computing system of claim 15 further configured to perform operations comprising:
defining the maximum queue depth for the RAID array based, at least in part, upon one or more of: the number of drives in the RAID array, and the type of drives in the RAID array.

20. The computing system of claim 15 further configured to perform operations comprising:
decrementing the actual queue depth based upon the revised IO queue weight upon execution of the IO request.

21. The computing system of claim 15 wherein the RAID array includes one or more of: a hard disk drive and a solid state disk.

* * * * *